United States Patent [19]

Ohba et al.

[11] Patent Number: 5,642,499
[45] Date of Patent: Jun. 24, 1997

[54] METHOD AND APPARATUS FOR CONTROLLING TIMING OF EXECUTION OF SAVING AND RESTORING OPERATIONS IN A PROCESSOR SYSTEM

[75] Inventors: Mamoru Ohba; Shigeki Morinaga, both of Hitachi; Mitsuru Watabe, Katsuta; Hiroyuki Kida, Kokubunji, all of Japan

[73] Assignee: Hitachi, Ltd., Tokyo, Japan

[21] Appl. No.: 223,834

[22] Filed: Apr. 6, 1994

Related U.S. Application Data

[63] Continuation of Ser. No. 443,200, Nov. 30, 1989, abandoned.

[30] Foreign Application Priority Data

Nov. 30, 1988 [JP] Japan .................. 63-300575

[51] Int. Cl.⁶ .............. G06F 15/16; G06F 9/38; G06F 11/28
[52] U.S. Cl. .............. 395/569; 395/591; 395/800
[58] Field of Search .............. 395/800, 375, 395/591, 569

[56] References Cited

U.S. PATENT DOCUMENTS

| | | | |
|---|---|---|---|
| 4,715,013 | 12/1987 | MacGregor | 395/375 |
| 4,750,110 | 6/1988 | Mothersole et al. | 395/375 |
| 4,977,497 | 12/1990 | Sakamura et al. | 395/375 |

OTHER PUBLICATIONS

MC 68020 32-Bit Microprocessor User's Manual; 1985 Section 8.
MC 68881/MC 68882 User's Manual Section 8.
MC68881/MC68882, Floating-Point Coprocessor User's Manual 1987, Motorola; Section 1, Section 6.4, pp. 7-7; 3-7-3-12; 4-16-4-89.
Motorola, MC68881 Floating-Point CoProcessor User's Manual, 1985 pp. 1-6-1-9, 2-16-2-18 4-1-4-38.
"The MC68881 Floating-point Coprocessor" 1983, Huntsman et al.

Primary Examiner—Larry D. Donaghue
Attorney, Agent, or Firm—Antonelli, Terry, Stout & Kraus, LLP

[57] ABSTRACT

In a coprocessor system having a central processing unit (CPU), a floating-point processing unit (FPU) and a memory (RAM), coupled with each other through buses, when the CPU issues a save command to the FPU, the FPU discriminates the attribute, i.e., a long command or a short command, of a current command executed by the FPU upon receipt of the save command and the internal status thereof. In response to the discrimination result, the FPU interrupts the execution of the current command at once to start the execution of the received save command, when the current command is a long command, and the FPU executes the received save command after the completion of execution of the current command, if the current command is a short command. The attribute of a command is determined in advance on the basis of a time necessary for executing the command and a predetermined criterion provided therefor.

37 Claims, 14 Drawing Sheets

FIG. 6
FRAME HEADER (FH)
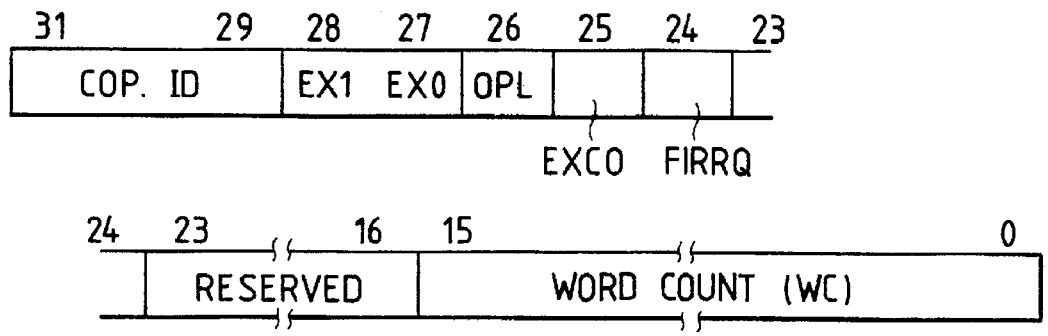
FIG. 7a
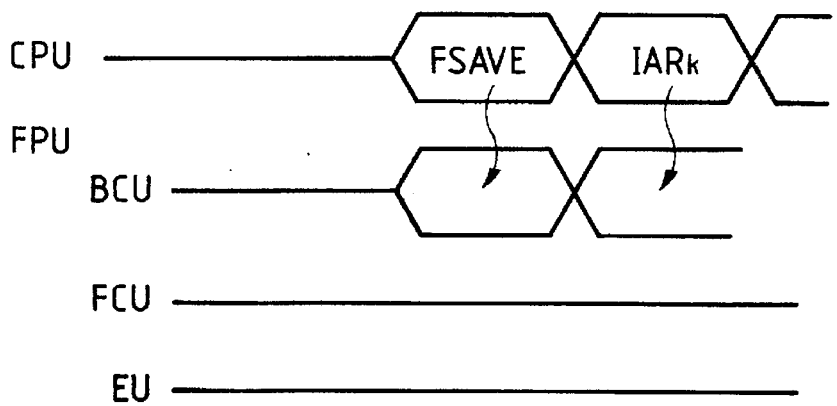
(EX1, EX0) = (0, 0) , OPL = 0
FIG. 7b
| ADD. | ORD. | |
|------|------|------|
| $n  | 1    | FH (WC=0) |
TOTAL NUMBER OF WORDS TO BE TRANSFERRED
= 1 WORD (EX1, EX0) = (0,0), OPL = 1

| ADD. | ORD. | |
|---|---|---|
| $n | 1 | FH (WC=5) |
| $n + 4 | 6 | UNEXECUTED COM. |
| $n + 8 | 5 | INSTR. ADD. OF UNEXECUTED COM. |
| $n + C | 4 | OPERAND |
| $n + 10 | 3 | |
| $n + 14 | 2 | |

TOTAL NUMBER OF WORDS TO BE TRANSFERRED = 6 WORDS

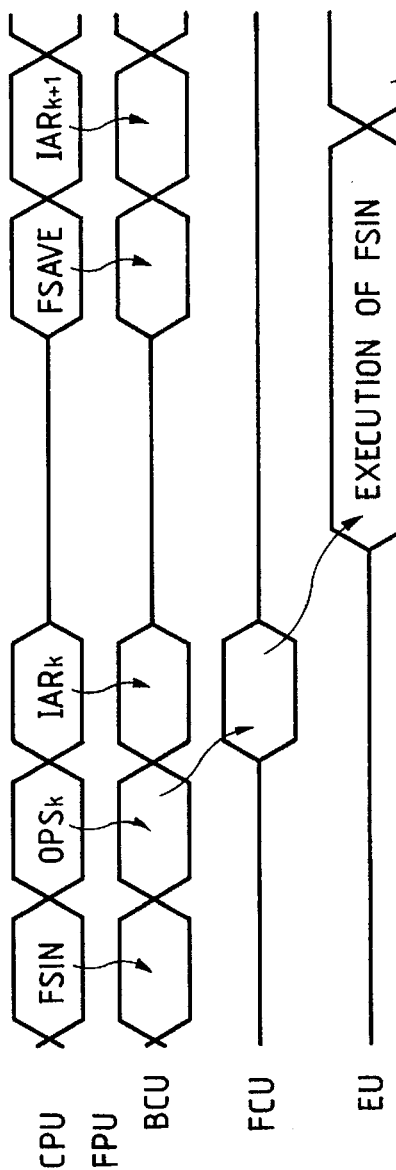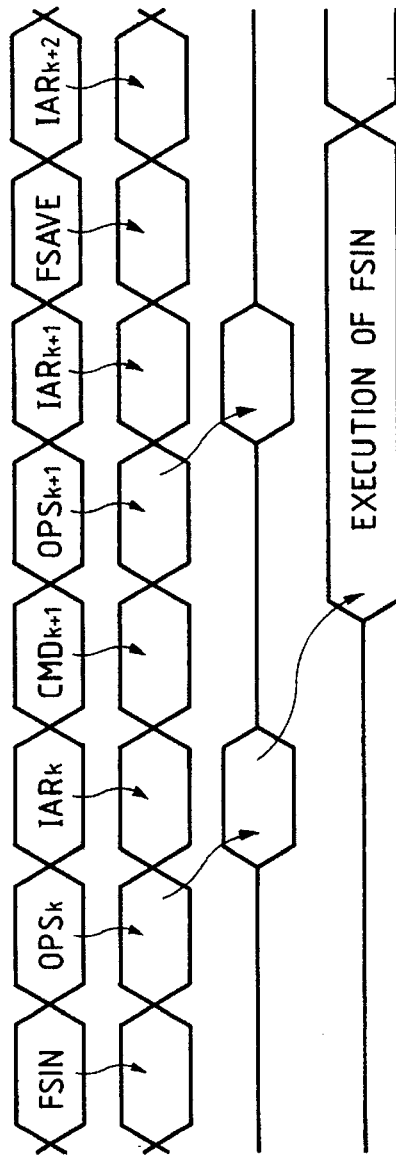

FIG. 9b

| ADD. | ORD. | |
|---|---|---|
| $n | 1 | FH (WC = 26) |
| $n + 4 | 27 | INTERRUPTED COM. |
| $n + 8 | 26 | INSTR. ADD. OF INTERRUPTED COM. |
| $n + C | 25 | TEMPORARY REGISTER TR0 |
| $n + 10 | 24 | |
| $n + 14 | 23 | |
| ⋮ | ⋮ | ≈ |
| $n + 60 | 4 | TEMPORARY REGISTER TR7 |
| $n + 64 | 3 | |
| $n + 68 | 2 | |

TOTAL NUMBER OF WORDS TO BE TRANSFERRED = 27 WORDS

FIG. 10b

| ADD. | ORD. | |
|---|---|---|
| $n | 1 | FH (WC = 31) |
| $n + 4 | 32 | INTERRUPTED COM. |
| $n + 8 | 31 | INSTR. ADD. OF INTERRUPTED COM. |
| $n + C | 30 | TEMPORARY REGISTERS TR0 ≀ TR7 |
| ⋮ | ⋮ | |
| $n + 68 | 7 | |
| $n + 6C | 6 | UNEXECUTED COM. |
| $n + 70 | 5 | INSTR. ADD. OF UNEXECUTED COM. |
| $n + 74 | 4 | OPERAND |
| $n + 78 | 3 | |
| $n + 7C | 2 | |

TOTAL NUMBER OF WORDS TO BE TRANSFERRED = 32 WORDS

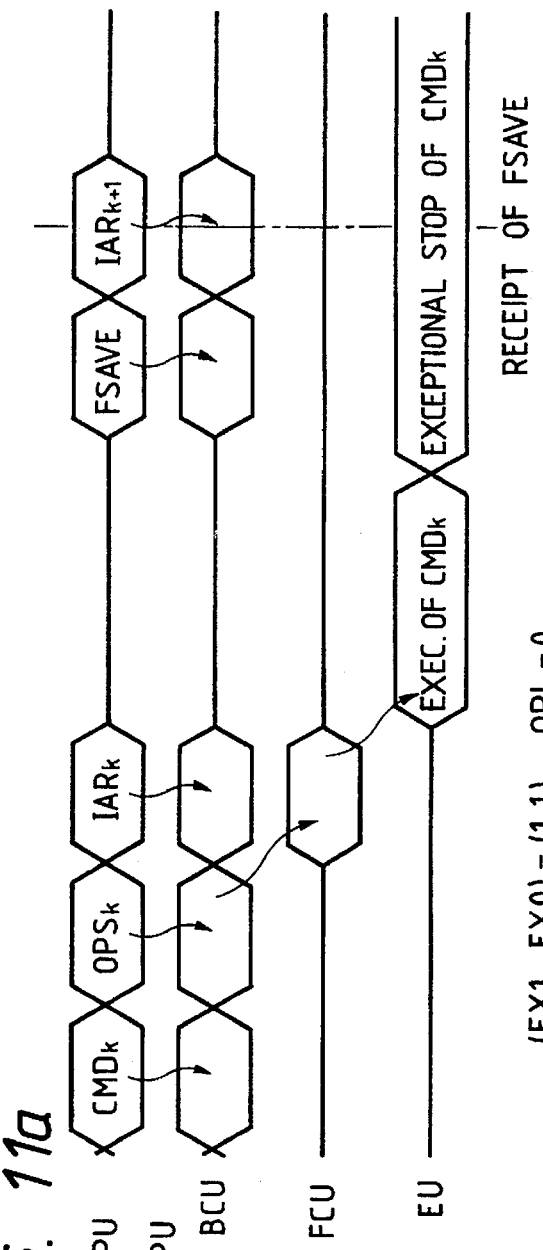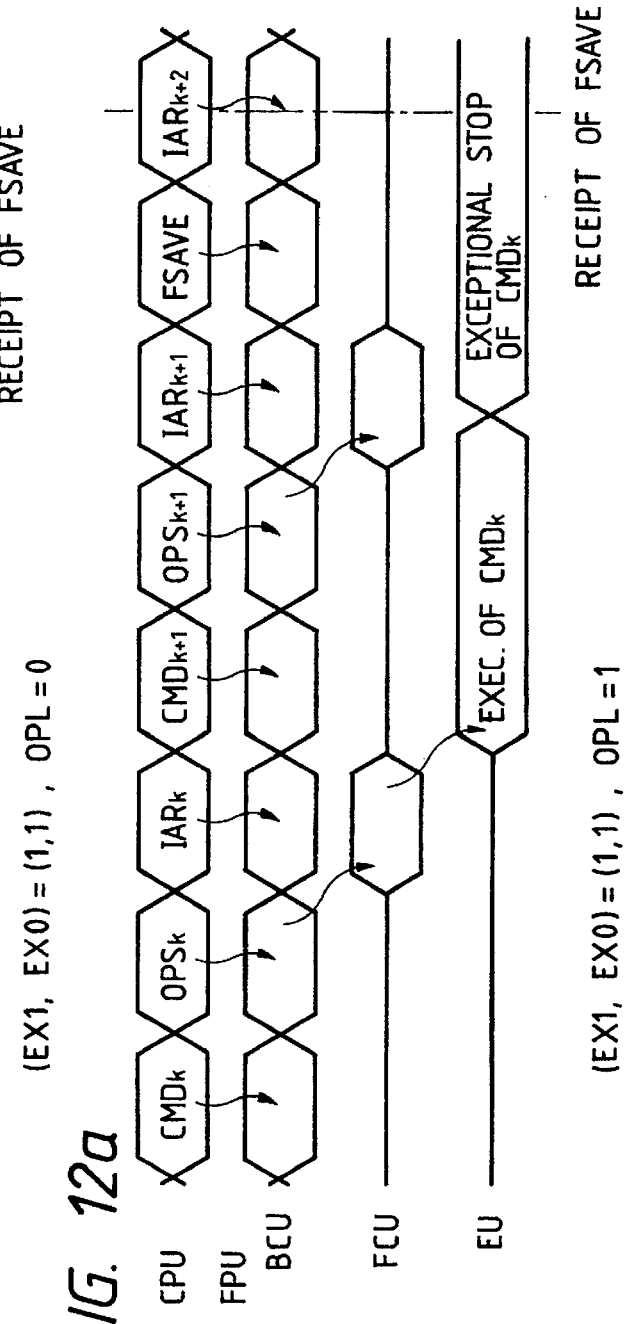

FIG. 11b

| ADD. | ORD. | |
|---|---|---|
| $n | 1 | FH (WC = 26) |
| $n + 4 | 27 | EXCEPTIONAL COM. |
| $n + 8 | 26 | INSTR. ADD. OF EXCEPTIONAL COM. |
| $n + C | 25 | TEMPORARY REGISTER TR0 (EXCEPTIONAL OPERAND) |
| $n + 10 | 24 | |
| $n + 14 | 23 | |
| $n + 18 | 22 | TEMPORARY REGISTERS  TR 1 ⋮ TR 7 |
| ⋮ | ⋮ | |
| $n + 68 | 2 | |

TOTAL NUMBER OF WORDS TO BE TRANSFERRED = 27 WORDS

FIG. 12b

| ADD. | ORD. | |
|---|---|---|
| $n | 1 | FH (WC = 31) |
| $n + 4 | 32 | EXCEPTIONAL COM. |
| $n + 8 | 31 | INSTR. ADD. OF EXCEPTIONAL COM. |
| $n + C | 30 | TEMPORARY REGISTER TR0 (EXCEPTIONAL OPERAND) |
| $n + 10 | 29 | |
| $n + 14 | 28 | |
| $n + 18 | 27 | TEMPORARY REGISTERS  TR 1 ⋮ TR 7 |
| ⋮ | ⋮ | |
| $n + 68 | 7 | |
| $n + 6C | 6 | UNEXECUTED COM. |
| $n + 70 | 5 | INSTR. ADD. OF UNEXECUTED COM. |
| $n + 74 | 4 | OPERAND |
| $n + 78 | 3 | |
| $n + 7C | 2 | |

TOTAL NUMBER OF WORDS TO BE TRANSFERRED = 32 WORDS

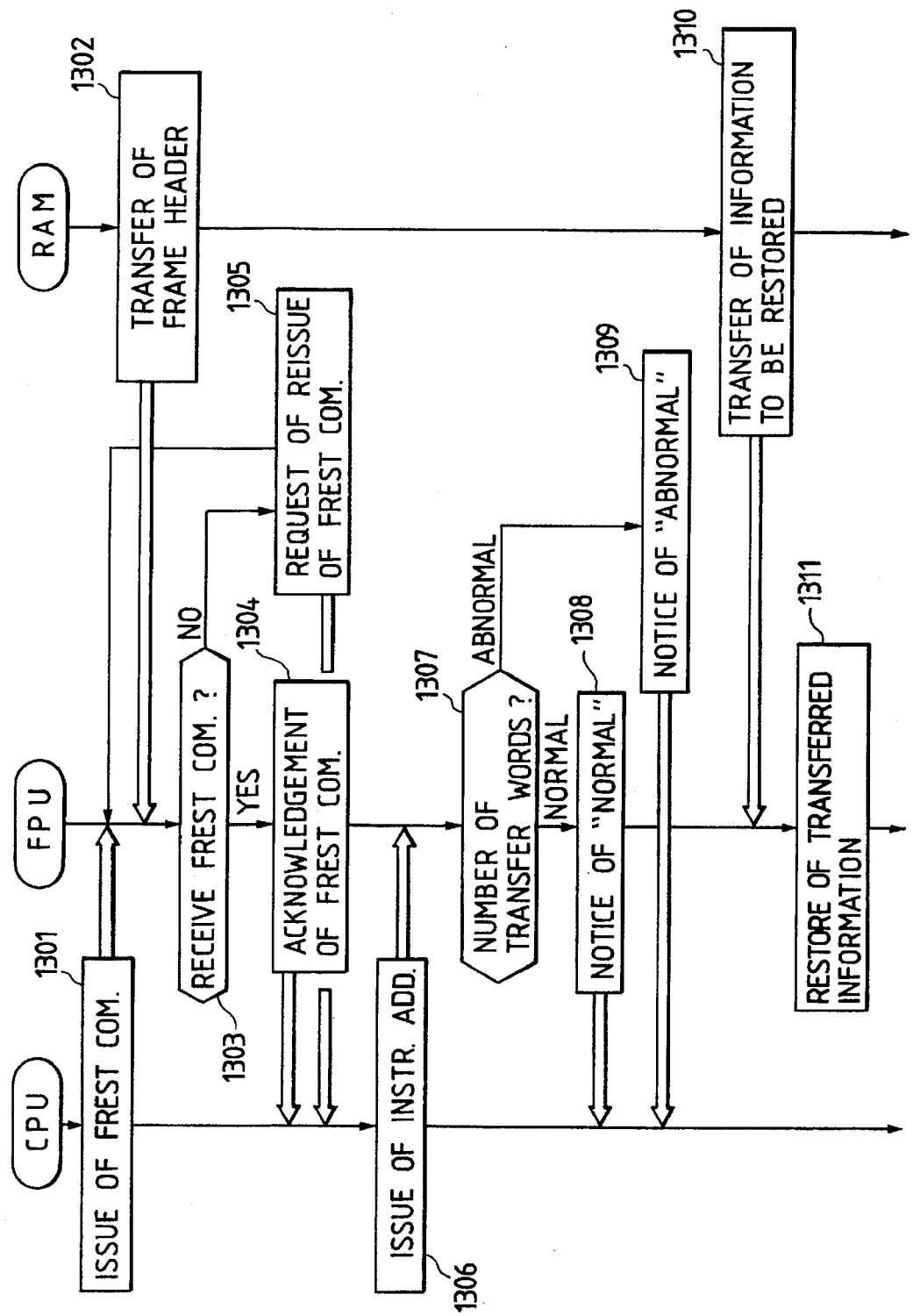

FIG. 14

| ADD. | ORD. | |
|---|---|---|
| $n | 1 | FH (WC=0) |

(EX1, EX0) = (0,0), OPL = 0
TOTAL NUMBER OF WORDS TO BE TRANSFERRED
= 1 WORD

FIG. 15

| ADD. | ORD. | |
|---|---|---|
| $n | 1 | FH (WC=5) |
| $n+4 | 2 | UNEXECUTED COM. |
| $n+8 | 3 | INSTR. ADD. OF UNEXECUTED COM. |
| $n+C | 4 | |
| $n+10 | 5 | OPERAND |
| $n+14 | 6 | |

(EX1, EX0) = (0,0), OPL = 0
TOTAL NUMBER OF WORDS TO BE TRANSFERRED
= 6 WORDS

FIG. 16

| ADD. | ORD. | |
|---|---|---|
| $n | 1 | FH (WC=26) |
| $n+4 | 2 | INTERRUPTED COM. |
| $n+8 | 3 | INSTR. ADD. OF INTERRUPTED COM. |
| $n+C | 4 | TEMPORARY REGISTER TR0 |
| $n+10 | 5 | |
| $n+14 | 6 | |
| ⋮ | ⋮ | ≈ |
| $n+60 | 25 | |
| $n+64 | 26 | TEMPORARY REGISTER TR7 |
| $n+68 | 27 | |

(EX1, EX0) = (1,0), OPL = 0
TOTAL NUMBER OF WORDS TO BE TRANSFERRED
= 27 WORDS

FIG. 17

| ADD. | ORD. | |
|---|---|---|
| $n | 1 | FH (WC = 31) |
| $n + 4 | 2 | INTERRUPTED COM. |
| $n + 8 | 3 | INSTR. ADD. OF INTERRUPTED COM. |
| $n + C | 4 | TEMPORARY REGISTERS TR 0 ⁞ TR 7 |
| ⁞ | ⁞ | |
| $n + 68 | 27 | |
| $n + 6C | 28 | UNEXECUTED COM. |
| $n + 70 | 29 | INSTR. ADD. OF UNEXECUTED COM. |
| $n + 74 | 30 | OPERAND |
| $n + 78 | 31 | |
| $n + 7C | 32 | |

(EX1, EX0) = (1,0), OPL=1
TOTAL NUMBER OF WORDS TO BE TRANSFERRED
= 32 WORDS

FIG. 18

| ADD. | ORD. | |
|---|---|---|
| $n | 1 | FH (WC = 26) |
| $n + 4 | 2 | EXCEPTIONAL COM. |
| $n + 8 | 3 | INSTR. ADD. OF EXCEPTIONAL COM. |
| $n + C | 4 | TEMPORARY REGISTER TR0 (EXCEPTIONAL OPERAND) |
| $n + 10 | 5 | |
| $n + 14 | 6 | |
| $n + 18 | 7 | TEMPORARY REGISTERS TR 1 ⁞ TR 7 |
| ⁞ | ⁞ | |
| $n + 68 | 27 | |

(EX1, EX0) = (1,1), OPL = 0
TOTAL NUMBER OF WORDS TO BE TRANSFERRED
= 27 WORDS

FIG. 19

| ADD. | ORD. | |
|---|---|---|
| $n | 1 | FH (WC = 31) |
| $n + 4 | 2 | EXCEPTIONAL COM. |
| $n + 8 | 3 | INSTR. ADD. OF EXCEPTIONAL COM. |
| $n + C | 4 | TEMPORARY REGISTER TR0 (EXCEPTIONAL OPERAND) |
| $n + 10 | 5 | |
| $n + 14 | 6 | |
| $n + 18 | 7 | TEMPORARY REGISTERS   TR 1 |
| ⋮ | ⋮ | ⋮   TR 7 |
| $n + 68 | 27 | |
| $n + 6C | 28 | UNEXECUTED COM. |
| $n + 70 | 29 | INSTR. ADD. OF UNEXECUTED COM. |
| $n + 74 | 30 | OPERAND |
| $n + 78 | 31 | |
| $n + 7C | 32 | |

(EX1, EX0) = (1,1), OPL = 1
TOTAL NUMBER OF WORDS TO BE TRANSFERRED
= 32 WORDS

METHOD AND APPARATUS FOR CONTROLLING TIMING OF EXECUTION OF SAVING AND RESTORING OPERATIONS IN A PROCESSOR SYSTEM

This application is a continuation application of Ser. No. 07/443,200, filed Nov. 30, 1989, now abandoned.

BACKGROUND OF THE INVENTION

The present invention relates to the improvement of a method of saving information from a processor and restoring the same to the processor, or sometimes to another processor, which is capable of reducing the time necessary for performing such saving and restoring of information. The present invention also concerns a processor system most suitable for implementation of the same method.

When a processor executes a command, and another command, which has the higher priority of execution, is issued, a processor must interrupt the execution of the command currently executed and start the execution of the another command. At that time, information existing within the processor upon receipt of the other command must be saved in an appropriate storage, and after completion of the execution of the other command, the saved information must be restored in the processor, or sometimes in another processor. These operations are known as a so-called interruption and interruption processing.

The following explanation will be made, taking a so-called coprocessor system as an example. There is already known a coprocessor system for a high-performance microcomputer system, in which, in addition to a main or host processor, there is provided a second processor, called a coprocessor, which executes external module functions, such as a floating-point calculation and a complicated input/output control including a direct memory access (DMA) control. With such a coprocessor system, not only the high performance of a microcomputer system is realized, but also the freedom or flexibility increases in the construction of a microcomputer system.

In such a coprocessor system, information of an internal status of a coprocessor must be saved in an appropriate storage, when a save command is issued by a host processor and restored therefrom, when a restore command is issued. One of conventional methods of saving and restoring is discussed, for example, in the article "The MC68881 Floating-point Coprocessor" by Clayton Huntsman et al on pp. 44 to 54 of "IEEE MICRO" Vol. 3, No. 6 (December 1983).

According to this publication, when a coprocessor receives a save command, the coprocessor discontinues the execution of a current command executed at that time irrespective of a time necessary for execution of the current command, and initiates the execution of the save command at once.

In such prior art, however, if the execution of a command is discontinued at random, a large amount of intermediate results of the execution of the command occurs, so that an amount of information transferred from the coprocessor to the storage increases. The large amount of information to be transferred causes a very long time of execution of the save command. As a result, the host processor must wait for a long time, until the execution of the save command is completed. This results in a degrading of the responsiveness of the microcomputer system.

SUMMARY OF THE INVENTION

It is an object of the present invention to provide a saving and restoring method in a processor system, according to which the amount of information to be saved by a save command is made as small as possible, whereby the time necessary for saving information, and for restoring the same, is reduced and the processing performance of the processor system is enhanced as whole. The object of the present invention also resides in providing a processor system, which is most suited for implementation of the saving and restoring method as mentioned above.

A feature of the present invention is in that in a processor system having a processing unit and a memory coupled with each other through buses, when a save command is issued to the processing unit, the processing unit discriminates the attribute of a current command executed thereby upon receipt of the save command and the internal status thereof, and in response to the discrimination result, the processing unit interrupts the execution of the current command at once to start the execution of the received save command, or executes the received save command after the execution of the current command is completed.

BRIEF DESCRIPTION OF THE DRAWINGS

FIG. 6 shows a structure of a frame header used in the saving and restoring operation according to the embodiment of the present invention;

FIGS. 7a, 8a, 9a, 10a, 11a and 12a show, for every case of the internal status of the floating-point processing unit, the timing chart of the saving operation;

FIGS. 7b, 8b, 9b, 10b, 11b and 12b show contents of information to be transferred for saving, an order of transfer and addresses of a memory, at which information transferred is stored, corresponding to FIGS. 7a, 8a, 9a, 10a, 11a and 12a, respectively;

FIG. 13 is a flow chart showing the operation of the coprocessor system in accordance with the embodiment of the present invention, when a restore command is issued; and FIGS. 14 to 19 show contents of information to be transferred for restoring, an order of transfer and addresses of a memory, at which information transferred is read out, which correspond to FIGS. 7b, 8b, 9b, 10b 11b and 12b, respectively.

DESCRIPTION OF THE PREFERRED EMBODIMENTS

In the following, description will be made of an embodiment of the present invention, with reference to the accompanying drawings. As already described, the embodiment is explained, taking a coprocessor system as an example.

Figure 1:
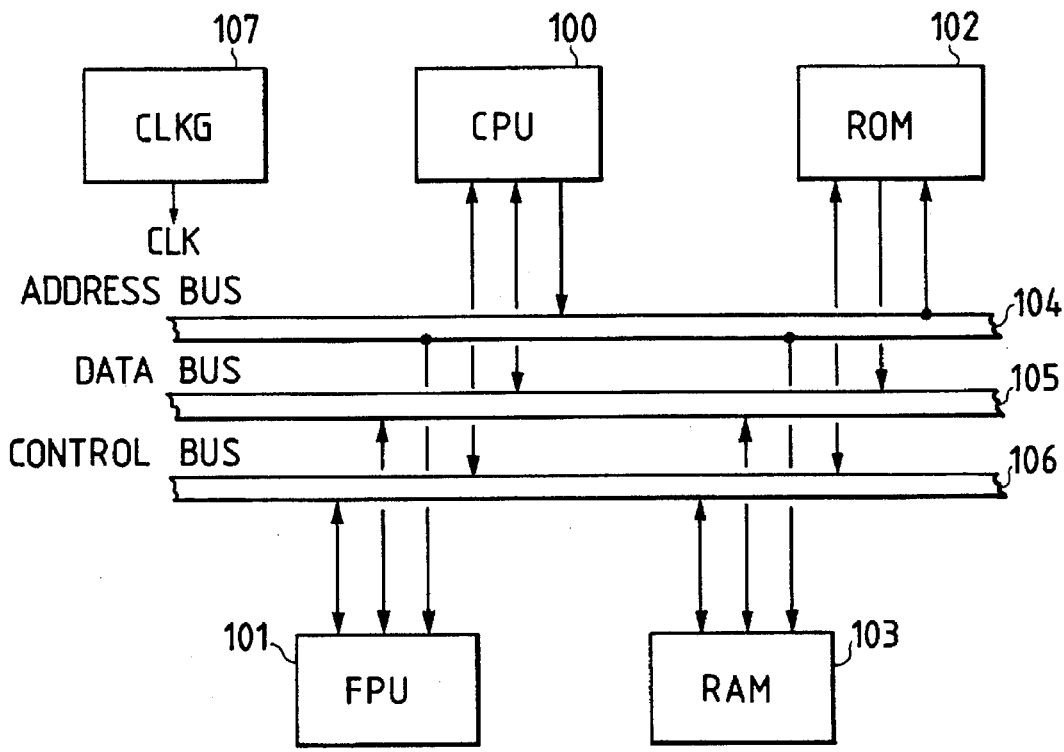
FIG. 1 schematically shows an overall construction of a coprocessor system with a floating-point processing unit as an example of a processor system, to which the present invention is applied.

FIG. 1 schematically shows an overall construction of a microcomputer system capable of performing a floating-point processing at a high speed, as an example of a coprocessor system, to which the present invention is applied. Therefore, the microcomputer system includes two processing units, i.e., central processing unit (CPU) 100 as a host processor and floating-point processing unit (FPU) 101 as a coprocessor.

The CPU 100 processes only integer data and does not carry out the processing of floating-point data. If the CPU 100 is made to process floating-point data, it has to be provided with software or programs to support such processing, so that the processing speed of the microcomputer system decreases as a whole. To prevent this, as already known, there is provided the FPU 101 which exclusively performs the processing of floating-point data at a high speed.

The microcomputer system is further provided with a read-only memory (ROM) 102 and a random-access memory (RAM) 103. The ROM 102 stores programs including instructions to be executed by both the CPU 100 and the FPU 101. Since, however, instructions can be decoded only by the CPU 100, a high-speed interface is achieved by a protocol exclusively provided for the communication between the CPU 100 and the FPU 101. The RAM 103 stores integer data and floating-point data to be processed and intermediate and final results of the processing.

The aforesaid CPU 100, FPU 101, ROM 102 and RAM 103 of the microcomputer system are coupled with each other through three busses, i.e., address bus 104, data bus 105 and control bus 106. As usual, the microcomputer system further includes clock generator (CLKG) 107 for generating clock signals (CLK) supplied to the CPU 100, FPU 101, ROM 102 and RAM 103, however, for brevity, signal lines therefor are omitted in the figure.

Figure 2:
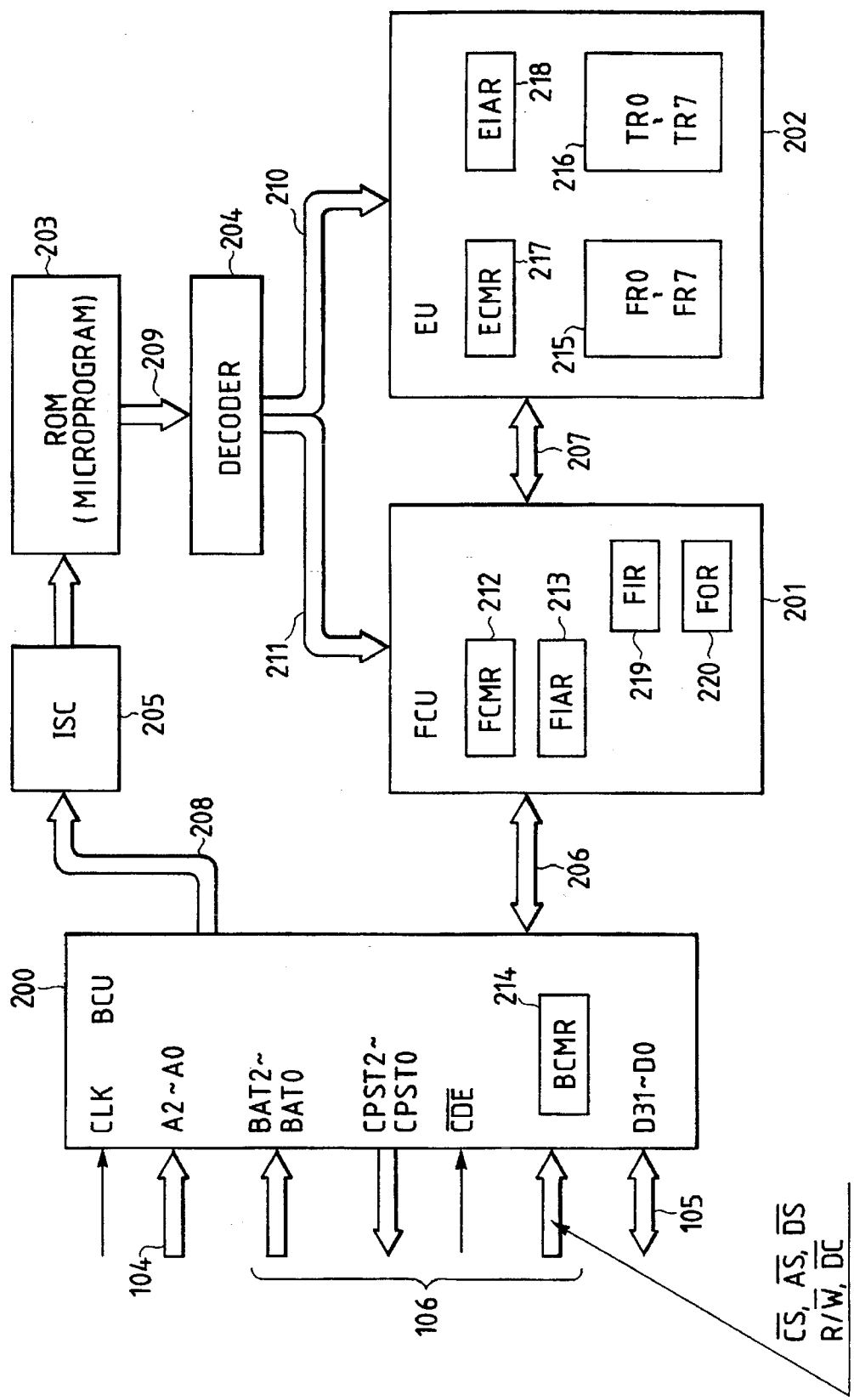
FIG. 2 schematically shows a construction of a floating-point processing unit according to an embodiment of the present invention, which is used in the coprocessor system as shown in FIG. 1.

Referring next to FIG. 2, there is shown the construction of the FPU 101 according to the embodiment of the present invention.

As shown in this figure, there is provided in the FPU 101 a bus control unit (BCU) 200, as an interface unit, for realizing a high-speed interface of the FPU 101 with other units or devices of the microcomputer system. Signals supplied to and derived from the bus control unit 200 are as follows:

CLK: a clock signal supplied from the clock generator 107;

A: an address signal supplied from the CPU 100 through the address bus 104. This signal is a three bit signal, each bit being indicated by A2 to A0; and D: data derived from and supplied to other units and devices through the data bus 105. Data is composed of 32 bits, i.e., D31 to D0.

Further, as signals supplied to and derived from the bus control unit 200 through the control bus 106, there are the following:

$\overline{CS}$: a chip select signal. If a device, other than the FPU 101, asserts this signal (i.e., makes a signal CS a low level), the FPU 101 is selected as a processing unit which carries out the data communication with the device;

$\overline{AS}$: an address strobe signal indicating the existence of an address signal on the address bus 104;

$\overline{DS}$: a data strobe signal indicating that data on the data bus 105 is established;

R/$\overline{W}$: a signal indicating the data transfer direction, which assumes "1" upon the read operation of the CPU 100 and "0" upon the write operation thereof;

$\overline{DC}$: a signal indicating the completion of the data transfer through the data bus 105. In the case of the data transfer between the CPU 100 and the FPU 101, this signal is outputted to CPU 100 from the FPU 101, when the data transfer is completed, and in the case of the data transfer between the FPU 101 and an external memory, the RAM 103, for example, this signal is inputted to the FPU 101 from the external memory, when the data transfer is completed;

$\overline{CDE}$: a coprocessor data enable signal, which is supplied by the CPU 100 as an output timing signal. The FPU 101 outputs a destination operand (processing result) onto the data bus 105 in one clock cycle after this signal is asserted;

CPST: a signal indicating an internal operating status of the FPU 101. This signal is a three bit signal composed of CPST2 to CPST0; and BAT: a signal indicating a kind of access made by the CPU 100. This signal is also a three bit signal composed of BAT2 to BAT0.

When the FPU 101 receives the signal BAT from the CPU 100, it operates accordingly and returns to the CPU 100 the signal CPST indicating its internal status as the result of the operation. Thereby, the protocol is exchanged between the CPU 100 and the FPU 101. Codes and their meaning of the signal CPST are as follows:

| Code | |
|---|---|
| 000 | don't care |
| 011 | busy: This means that the preparation of transfer of an operand is not yet ready, or that the FPU 101 is in the condition that it can not receive a command. |
| 010 | command acknowledged/condition true/word count correct: This means that a normal command is acknowledged or that the result of executing a conditional branch command is true or that the word count upon execution of a restore command FREST is corrected. |
| 011 | data transfer prepared/condition false: This means that the preparation of transferring an operand to a memory is ready or that the result of executing a conditional branch command is false: |
| 100 | don't care |
| 101 | command anomalous/word count incorrect: This means that a command fetched is undefined or that the word count upon execution of a restore command FREST is incorrect: |
| 110 | coprocessor-exceptional operation/request for reissue of instruction: This means that the execution of a command results in exceptions. |
| 111 | exception of coprocessor not connected: This means that an FPU (coprocessor), which does not exist within a coprocessor system, is designated. |

Further, codes and their meaning of the signal BAT are as follows:

| Code | |
|---|---|
| 000 to 011 | don't care memory-FPU data transfer: This means the data transfer between a memory and registers of an FPU. |

-continued

| Code | |
|---|---|
| 101 | instruction address transfer:<br>This means the transfer of an instruction address of a command to be executed by an FPU from a CPU. |
| 110 | command transfer:<br>This means the transfer of a command to be executed by an FPU from a CPU. |
| 111 | CPU-FPU data transfer:<br>This means the data transfer between a CPU and registers of an FPU. |

Moreover, the bus control unit (BCU) 200 includes command register (BCMR) 214, which stores a command issued by the CPU 100 to be executed by the FPU 101. The CPU 100 issues commands by decoding a floating-point processing instruction read out from the ROM 102.

The FPU 101 also includes format conversion unit (FCU) 201. This unit 201 communicates data with the bus control unit 200 through data bus 206 and converts the data in the external format into data of the internal format of the FPU 101, and vice versa. The external format data can be a signal precision format data, a double precision format data and a double-expanded precision format data, which are defined by the IEEE standard P754, for example. The internal format is determined in advance in one selected from among the aforesaid three formats, e.g., in the double-expanded precision format in this embodiment.

Figure 3:
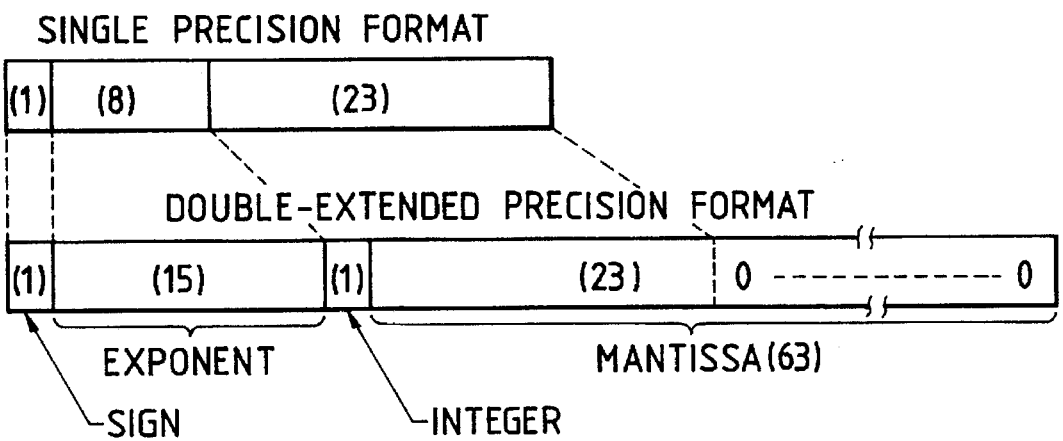
FIG. 3 is an explanatory drawing of data formats for explaining the format conversion.

Although the format conversion of this sort is already known, an example of the format conversion will be explained briefly, with reference to FIG. 3. By way of example, assuming that external data taken in the bus control unit 200 and outputted therefrom to the format conversion unit 201 is of the single precision format (one bit for a sign, 8 bits for an exponent and 23 bits for a mantissa), the format conversion unit 201 converts it into the double-extended precision format which is the internal format of the FPU 101, in the following manner.

At first, the 8-bit exponent portion in the signal precision format is converted into a form of 15 bits according to the aforesaid IEEE standard, whereby an exponent portion of the double-expanded precision format is formed. Then, the 23-bit mantissa portion of the signal precision format is put into a mantissa portion of the double-expanded precision format by successively stuffing it from the left-end bit and filling all the remaining bits with "0" so as to form the mantissa portion of total 63 bits.

In the case where data of an execution unit 202, which will be described later, is to be transferred to the bus control unit 200, the format conversion unit 210 converts the data format from the internal format (the double-expanded precision format) to the external format as specified by means of the reverse conversion of the above mentioned conversion.

The format conversion unit 201 is provided with the following registers, i.e., command register (FCMR) 212, instruction address register (FIAR) 213, input register (FIR) 219 and output register (FOR) 220. The command register 212 stores a command which is issued by the CPU 100 and executed by the FPU 101. The contents of this register 212 include a command which uses data converted by the format conversion unit 201.

The instruction address register 213 stores an instruction address issued by the CPU 100. This instruction address is used for the following purpose. In a processor which does not carry out pipeline processing, if the processor anomalously stops operating, it can be easily recognized that the anomalous stop is caused by a command under execution, because only one instruction is executed at that time. On the other hand, however, plural instructions are simultaneously executed in a processor which carries out pipeline processing. An instruction address is used in order to identify which command causes the anomalous stop. Therefore, an instruction address is necessary to attend every command in the pipeline processing system.

The input register 219 stores data of the internal format, which is converted from data of the external format, and the output register 220 stores data, which is obtained by converting internal format data into one of the external formats as designated.

The FPU 101 includes execution unit (EU) 202, which receives converted internal format data from the format conversion unit 201 and executes a predetermined processing to perform a floating-point operation. The execution unit 202 is provided with floating-point registers (FR0 to FR7), composed of 8 words, for storing data used for the operation and the result of operation, and temporary registers (TR0 to TR7), which are also composed of 8 words and temporarily store intermediate results of the operation.

The execution unit 202 is further provided with command register (ECMR) 217 and instruction address register (EIAR) 218. The former stores a command issued by the CPU 100 and executed by the execution unit 202 and the latter stores an instruction address of a command issued by the CPU 100. In addition to the registers as mentioned above, the execution unit 202, as usually known, includes an arithmetic logic unit, barrel shifters and multipliers.

The FPU 101 includes ROM 203, in which a microprogram for executing the floating-point processing is stored. Instruction executing codes read out from the ROM 203 are decoded by decoder 204, whereby control signals 210 and 211 are generated. These control signals 210 and 211 are applied to the execution unit 202 and the format conversion unit 201 to control them, respectively.

The reading-out of the instruction executing codes from the ROM 203 is controlled by signals from instruction sequencer 205, to which a command, which is issued by the CPU 100 and received by the bus control unit 200, is given through instruction bus 208.

Figure 4:
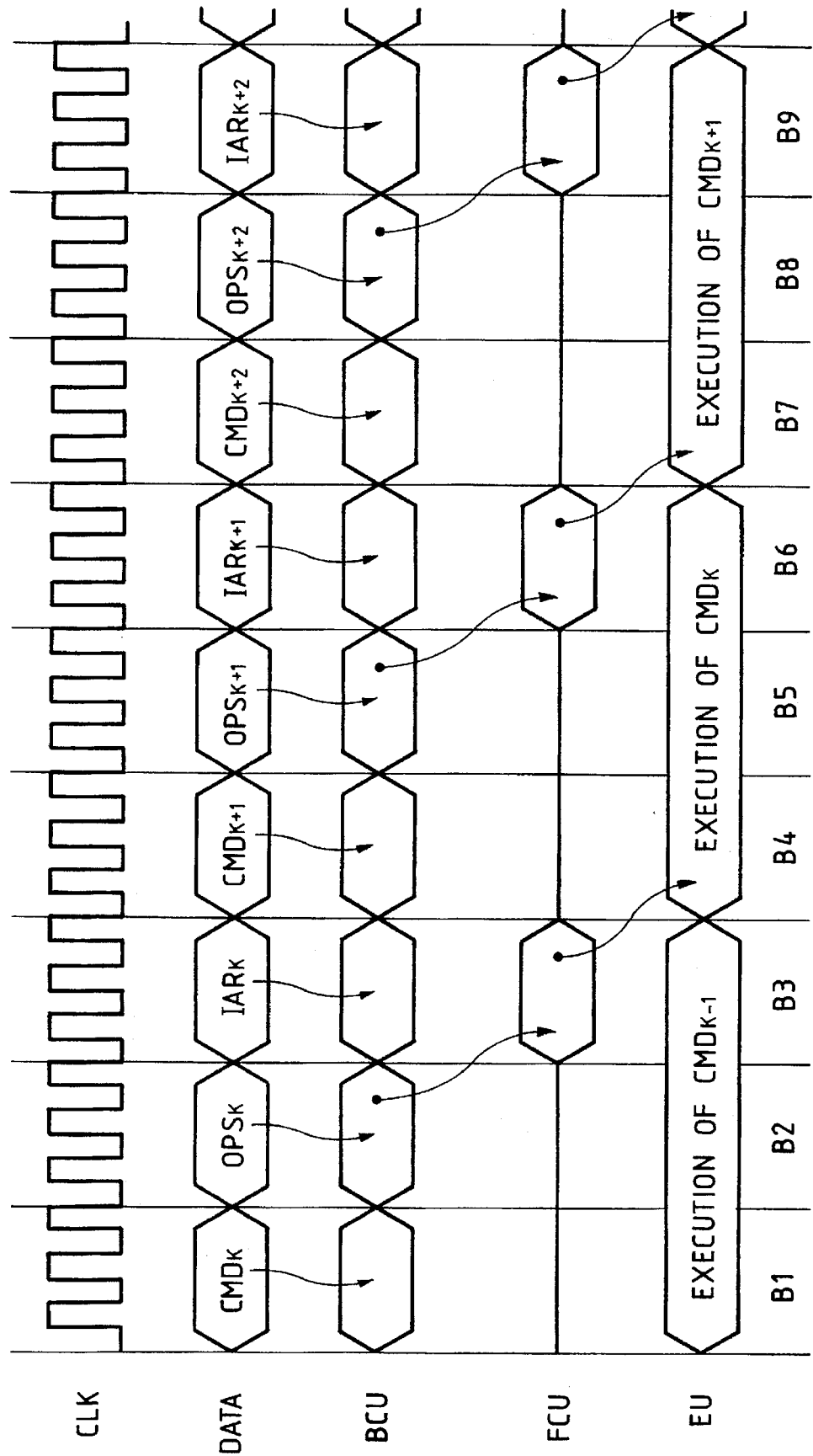
FIG. 4 is a timing chart for explaining the pipeline processing which is carried out in the coprocessor system as shown in FIG. 1.

Referring next to FIG. 4, explanation will be made of the pipeline processing carried out in the FPU 101 and its operational timing. This figure shows a flow from a k-th command $CMD_k$ to a (k+2)-th command $CMD_{k+2}$.

The command $CMD_k$ and its operand $OPS_k$ and instruction address $IAR_k$, which are transferred from the CPU 100, are successively inputted to the bus control unit (BCU) 200 through the data bus 105 for every bus cycle B1 to B3. Among those, the command $CMD_k$ is inputted to the instruction sequencer 205 through the bus 208, whereby instruction executing codes 209 are read out from the ROM 203 in accordance with the command $CMD_k$, and they are decoded in the decoder 204 to produce the control signals 211, 210 for the format conversion unit 201 and the execution unit 202.

The operand $OPS_k$ is further inputted to the format conversion unit (FCU) 201 through the bus 206 in the bus cycle B3. The operand $OPS_k$ is subject to the format conversion in this unit 201.

The format-converted operand $OPS_k$ is transferred to the execution unit 202, in which the execution of the command $CMD_k$ is commenced and carried out through the bus cycles B4 to B6. On the other hand, at the same time as the commencement of the execution of the command $CMD_k$, the next, i.e., (k+1)-th, command $CMD_{k+1}$ starts to be fetched in the bus cycle B4.

In this manner, by controlling the operation of the bus control unit 200, the format conversion unit 201 and the execution unit 202 on the pipeline processing basis, the results of execution of the (k−1)-th command $CMD_{k-1}$, the k-th command $CMD_k$ and the (k+1)-th command $CMD_{k+1}$ can be obtained by the ends of the bus cycles B3, B6 and B9, respectively.

Further, in the example as mentioned above, there is shown the case where a source operand is in a memory and a destination operand is in a register.

As described above, the FPU 101 usually carries out the pipeline processing in such a way that the bus control unit 200, the format conversion unit 201 and the operation unit 202 are operated independently from each other, in order to realize high speed processing. To this end, the three units 200, 201, 202 have command registers 214, 212 and 217, respectively. Accordingly, the saving and restoring method according to the present invention can also be applied to a coprocessor system with a coprocessor, which, as mentioned above, carries out pipeline processing.

Further, the format conversion unit 201 and the execution unit 202 are provided with the instruction address registers 213 and 218 for storing instruction addresses of current commands executed by the units 201 and 202, respectively. Accordingly, although details will be described later, an instruction address of a command then being executed is included in information to be saved, whereby the analysis of occurrence of the anomalies is facilitated. Unless an instruction address of a current command executed in respective units is held by an instruction address register, the instruction address is dealt with in the same manner as other data and is lost among other data so as not to distinguish it thereover. This will make the analysis of anomalies very difficult.

Figure 5:
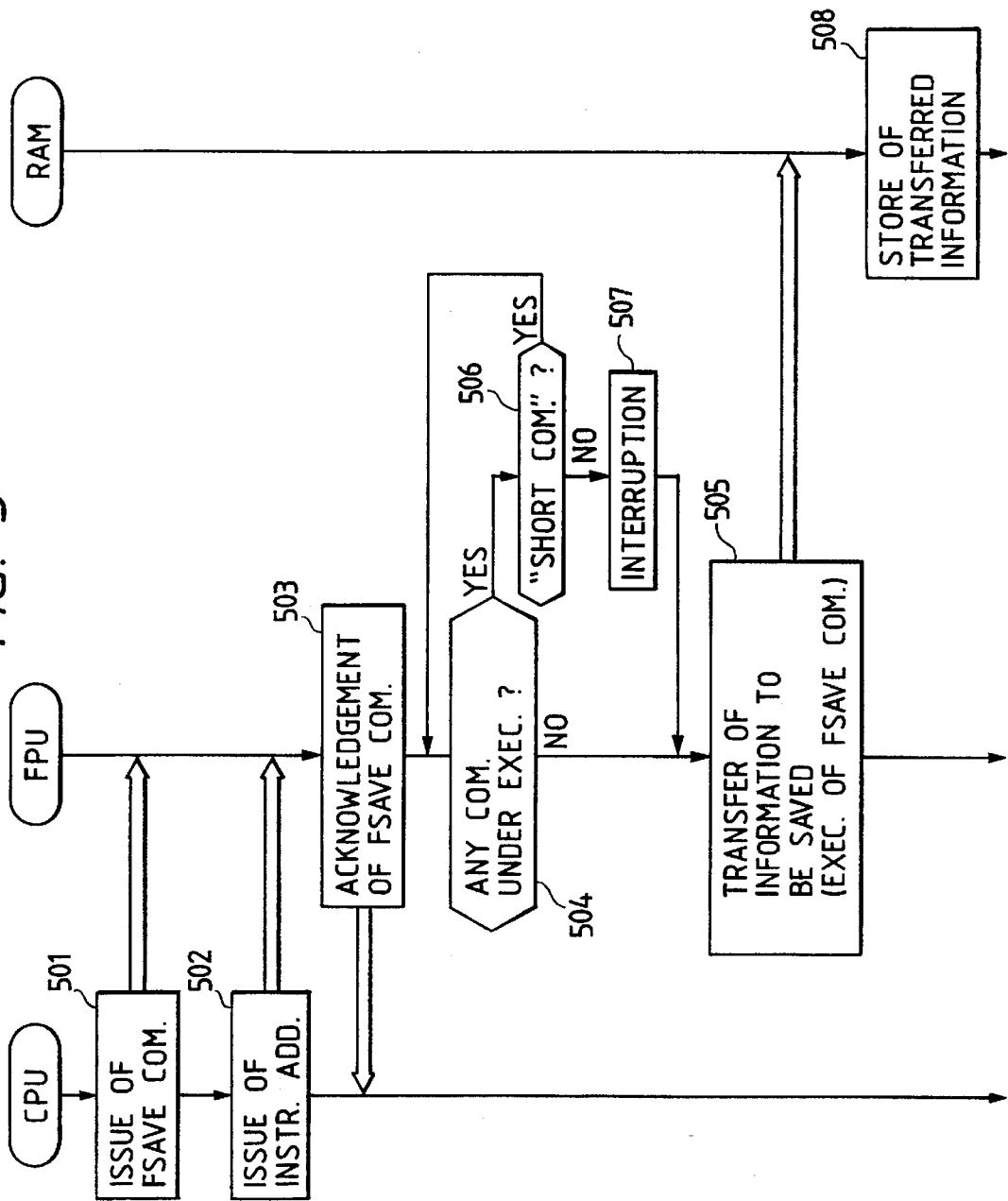
FIG. 5 is a flow chart showing the operation of the coprocessor system in accordance with an embodiment of the present invention, when a save command is issued.

Now, the operation to be carried out when a save command FSAVE is executed, will be described, referring to FIG. 5, in which there is shown a flow chart of the operation of the CPU 100, the FPU 101 and the RAM 103.

The command FSAVE performs the processing of transferring an internal status or information of the FPU 101 to external resources, such as the RAM 103. Namely, for example, the command FSAVE carries out the saving of the internal status of the FPU 101 in order to analyze a task switch or an anomalous (exceptional) stop, as described below.

i) Task switch

To switch a task A being executed by the FPU 101 at present to another task B. When an operating system (OS) for managing a whole system switches over the task A to the task B, the OS issues a save command FSAVE in order to save intermediate results of the processing of the task A from the FPU 101 to the RAM 103. Further, when the task A is executed again, a restore command FREST is issued in order to restore the saved intermediate results into the FPU 101.

ii) Anomalous stop

When the FPU 101 stops because of an exceptional cause, data of registers of the FPU 101 are transferred to the RAM 103 by a save command FSAVE, and the saved contents of the RAM 103 are referred to, in order to analyze the cause.

In the cases as mentioned above, the internal status of the FPU 101 can not be transferred to the RAM 103 by a transfer instruction provided for general cases. A command provided for coping with this is a save command FSAVE. If, however, the FPU 101 is under execution of any other command, it can not start to execute a save command FSAVE.

Therefore, a time from receipt of a command FSAVE to start of execution thereof greatly depends on the condition of the FPU 101 when the command FSAVE is received, i.e., whether the FPU 101 is in the interrupted condition or under operation, and further in the latter case, whether the FPU 101 just started the execution of a new command or will complete it soon, when the command FSAVE is received. Accordingly, the time necessary for the CPU 100, which issues a command FSAVE, to confirm the acknowledgment thereof varies very much, and in the worst case, the CPU 100 is forced to remain in the waiting condition for a long time.

To prevent this, the saving operation according to the present invention is performed as follows. At first, as shown in FIG. 5, the CPU 100 issues a save command FSAVE and its instruction address to the FPU 101 (steps 501, 502). When the FPU 101 confirms that a command sent from the CPU 100 is a save command FSAVE, it immediately receives the command unconditionally, whether the bus control unit 200, the format conversion unit 201 and the execution unit 202 are under operation or not. Then, the FPU 101 acknowledges the command FSAVE to the CPU 100 by means of the signal CPST (step 503).

However, the start of execution of the command FSAVE depends on the internal status of the execution unit 202 of the FPU 101 and the attribute of a command executed by the FPU 101 at that time. The relationship therebetween is represented in the table 1 below.

TABLE 1

| Status of the unit 202 | Execution of FSAVE |
| --- | --- |
| idle | started at once |
| exceptional status | started at once |
| under execution of commands FREM, FMOD, FSIN, FCOS, FTAN or FSINCOS | started at once |
| under execution of other commands | started after completion of execution of a command under execution |

In the table above:

FREM: IEEE modulo calculation instruction;

FMOD: modulo calculation instruction;

FSIN: sine conversion instruction;

FCOS: cosine conversion instruction;

FTAN: tangent conversion instruction; and

FSINCOS: sine and cosine conversion instruction.

Further, although there are used both terms "command" and "instruction" in the foregoing description, they can be considered to express substantially the same here. The term "instruction" is an expression, when viewed from the CPU 100 or an operator's standpoint, and the term "command" is an expression, when viewed from the FPU 101.

Among commands for the floating-point processing executed by the FPU 101, the commands FREM, FMOD, FSIN, FCOS, FTAN and FSINCOS as mentioned above belong to a group of commands which require a relatively long processing time. We will call a command of this group "a long command" for the convenience of the following explanation. If the FPU 101 receives a save command FSAVE during the execution of a long command, it interrupts the execution of the long command and starts the execution of the command FSAVE. At this time, of course, intermediate results of execution of the long command must be saved together with the internal status of the execution unit 202.

A command other than the aforesaid commands will be called "a short command". As a short command, there are various kinds of general operation commands such as FADD (add), FSUB (subtract), FMUL (multiply), FDIV (divide), FSCALE (scale), FABS (find absolute), FNEG (find negative), FSQRT (find square root), FINT (infinite), FIN-TRZ (extract mantissa), as well as commands for coordinates conversion, judgment, branch, transfer and other processings.

The aforesaid various commands has been enumerated only for the purpose of indicating examples of the long command and the short command. It is to be noted that all commands to be executed by the FPU 101 can be arbitrarily classified into two categories, i.e., a short command group or a long command group, in accordance with a predetermined criterion. Generally, a command including a repetitive operation, such as a command used in a calculation of approximation, will belong to a long command.

Returning to FIG. 5, after acknowledgment of the save command FSAVE (step 503), the FPU 101 discriminates whether or not there is any command under execution (step 504). If there is no command under execution, the processing of the FPU 101 goes to step 505. If there is any command under execution, it is further discriminated whether or not the command is a short command (step 506). This discrimination can be carried out on the basis of the classification or categorization of commands as mentioned above.

If the command under execution is discriminated to be a short command, steps 504 and 506 are repeatedly executed, until it is judged at step 504 that there is no command under execution. If it is judged at step 506 that the command under execution is discriminated to be not a short command, i.e., in the case where the command under execution is a long command, the execution of the long command is interrupted (step 507) and then the processing of the FPU 101 goes to step 505.

At step 505, the FPU 101 executes the command FSAVE, whereby information to be saved is formed based on the internal status of the FPU 101 and transferred to the RAM 103. The RAM 103 stores the transferred information (step 508). With this, the saving of the information within the FPU 101 is completed.

In the following, the formation of the information to be saved will be explained. Various indexes indicating the internal status of the FPU 101 and a word count (WS) indicating an amount of information to be transferred are included in a first word of the information to be transferred. This first word is called "a frame header (FH)", hereinafter. The construction of the frame header FH is as shown in FIG. 6.

The frame header FH includes a coprocessor identification COP.ID of three bits. In the case where a coprocessor system includes plural coprocessors, every coprocessor has a particular identification COP.ID. Therefore, it can be identified by this COP.ID. which identifies the coprocessor that originates the information to be saved. An index EX of two bits, represented by EX1 and EX0, indicates three kinds of status of the execution unit 202, as follows.

| EX1 | EX0 | Status of the unit 202 |
|---|---|---|
| 0 | 0 | idle |
| 0 | 1 | reserved |
| 1 | 0 | interruption processing |
| 1 | 1 | exception |

In the above, "idle" refers to a status in which the execution unit 202 has completed the execution of a command and has stopped to wait for a next command. "Interruption processing" means the status that since the FPU 101 receives a save command FSAVE during the execution of a long command, it interrupts the processing of the long command and stops. "Exception" refers to a status in which the execution of the FPU 101 is interrupted because of occurrence of anomalies and exceptions such as overflow, underflow, division by zero, and further execution becomes impossible.

An index OPL of one bit indicates whether or not an unexecuted command exists in the FPU 101. If OPL assumes the level "1", this means that there still exists a command that is unexecuted, although the FPU 101 operates to exchange a protocol with the CPU 100. These two indexes EX and OPL as mentioned above are important as indexes representing the internal status of the FPU 101 upon receipt of a save command FSAVE.

An index EXCO of one bit, which has the meaning only in the case of "exception", i.e., (EX1, EX0)=(1, 1), indicates that an operand used for the execution among the information saved by execution of the command FSAVE is bias-regulated by the format conversion unit 201. An index FIRRQ of one bit indicates that an unexecuted command in the FPU 101 has an operand. Accordingly, only when OPL representing the existence of an unexecuted command is set, FIRRQ is set.

The word count (WC) indicates a number of words of information to be saved, excluding the frame header FH. An amount of information to be saved is made variable in accordance with the internal status of the FPU 101 represented by the indexes EX (EX1, EX0) and OPL, whereby the transfer of unnecessary information is prevented. The relationship of EX (EX1, EX0), OPL and the word count (WC) is indicated in the table 2 below.

TABLE 2

| EX1 | EX0 | OPL | WC (words) |
|---|---|---|---|
| 0 | 0 | 0 | 0 |
| 0 | 0 | 1 | 5 |
| 1 | 0 | 0 | 26 |
| 1 | 0 | 1 | 31 |
| 1 | 1 | 0 | 26 |
| 1 | 1 | 1 | 31 |

A value of WC indicated above does not include the frame header FH. Therefore, the number of words to be actually transferred is by one word more than the value indicated in the table.

If the correspondence between EX1, EX0, OPL and WC is provided as a table in advance, the occurrence of an error in the data transfer can be easily checked by counting the number of words actually transferred and referring to the table.

In the following, an explanation will be made of the timing of operation of the CPU 100 and the FPU 101, as well as contents of information to be transferred, an order of transfer and addresses of the RAM 103, at which the information to be saved is stored, referring to FIGS. 7a, 7b to 12a, 12b.

By the way, when the FPU 101 is going to execute a save command FSAVE, its internal status can assume six kinds of status, which are represented by the combination of EX1, EX0 and OPL (it is to be noted that (EX1, EX0)=(0, 1) is reserved). Among the figures, FIGS. 7a, 8a, . . . , 12a show the execution timing of the CPU 100 and the FPU 101 for each of the aforesaid six kinds of the status, and FIGS. 7b, 8b, . . . , 12b show the contents of information to be transferred, the order of transfer (ORD) and the allocation of addresses (ADD) of the RAM 103.

Referring at first to FIG. 7a, there is shown the timing of execution, in the case where, when a save command FSAVE is issued by the CPU 100, the FPU 101 is idle ((EX1 ,EX0)=(0, 0)) and there is no unexecuted command (OPL =0). Namely, before issuance of the command FSAVE, the bus control unit (BCU) 200, the format conversion unit (FCU) 201 and the execution unit (EU) 202 of the FPU 101 are all idle. Therefore, when the command FSAVE and its instruction address $IAR_k$ are issued by the CPU 100, they are taken in the FPU 101 through the BCU 200, and the command FSAVE is executed at once.

In this case, only the frame header FH with WC=0, as shown in FIG. 7b, is transferred to the location of address $n of the RAM 103. No other information is not transferred. Therefore, the total number of words to be transferred is only one word.

Figures 8A, 8B:
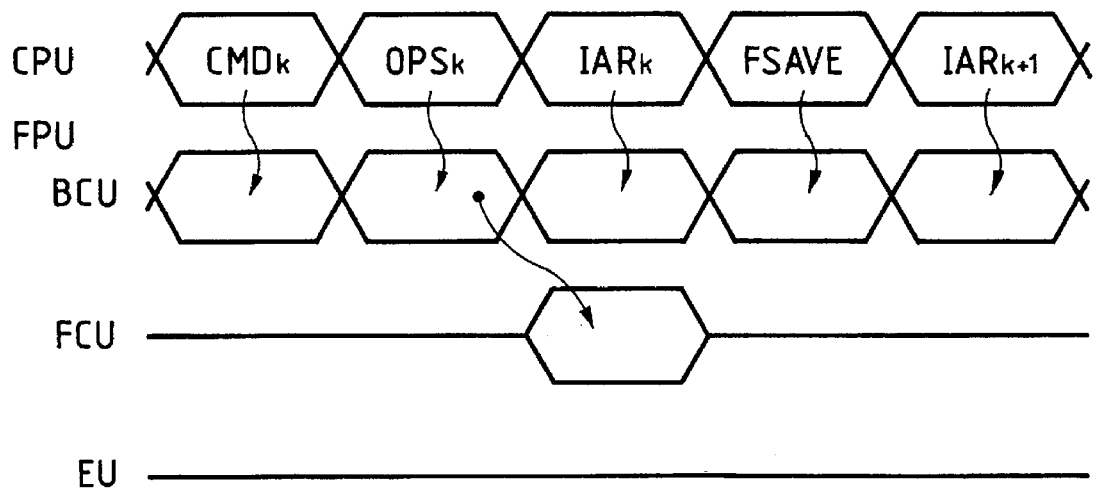

FIG. 8a is a timing chart of the execution under the condition that when the CPU 100 issues a save command FSAVE, the FPU 101 is idle ((EX1, EX0)=(0, 0)), but there exists a command which is unexecuted (OPL=1). More particularly, before issuing the command FSAVE, the CPU 100 issues a command $CMD_k$ as well as its operand $OPS_k$ and instruction address $IAR_k$ and transfers them to the FPU 101. At this time, in the FPU 101, the FCU initiates the format conversion of the operand $OPS_k$, however the EU 202 still keeps the status at the time of the execution of a previous command $CMD_{k-1}$ and therefore does not start to execute the command $CMD_k$ yet. Namely, the command $CMD_k$ remains unexecuted at this time.

FIG. 8b shows the contents of information to be transferred and the order of transfer as well as the allocation of addresses of the RAM 103 in this case. As shown in the figure, the contents of information to be saved from the FPU 101 to the RAM 103 include the frame header FH as well as the unexecuted command $CMD_k$ and its instruction address $IAR_k$ and operand $OPS_k$.

The word count WC of the frame header FH in this case assumes the value 5, and this means that five words are transferred, in addition to the frame header FH itself. The unexecuted command $CMD_k$ and its instruction address $IAR_k$ and operand $OPS_k$ are held in the command register 212, the instruction address register 213 and the input register 219 of the format conversion unit 201, respectively.

As already described, although the operand $OPS_k$, when it is issued from the CPU 100, is of the external format (the single precision format), it is converted into the internal format (the double-precision format) by the format conversion unit 201 and stored in the input register 219. Therefore, an area of three words is prepared for the operand $OPS_k$, as shown in FIG. 8b.

The FPU 101 transfers the information of the contents as mentioned above to the RAM 103 in the following order. At first, the frame header FH is transferred to the location of address $n of the RAM 103. Next, the operand $OPS_k$ of the internal format is transferred to the locations of addresses $n+14, $n+10 and $n+C of the RAM 103.

Thereafter, the instruction address $IAR_k$ of the unexecuted command $CMD_k$ is transferred to the location of address $n+8 of the RAM 103, and lastly the unexecuted command $CMD_k$ is transferred to the location of address $n+4 of the RAM 103.

Referring next to FIG. 9a, there is shown a timing chart of the execution under the condition that when the CPU 100 issues a save command FSAVE, the FPU 101 is in the interruption processing ((EX1, EX0)=(1, 0)), but there is no command which is unexecuted (OPL=0). More particularly, the CPU 100 issues a command FSIN for calculating a sine function as well as an operand $OPS_k$ and instruction address $IAR_k$ thereof, and transfers them to the FPU 101.

In the FPU 101, after receipt of them in the BCU 200, the FCU converts the format of the operand $OPS_k$ and then the EU 202 starts the execution of obtaining a sine value with respect to the format-converted operand $OPS_k$. Under those circumstances, if the CPU 100 issues a save command FSAVE during the execution of the command FSIN, the FPU 101 receives the save command FSAVE and starts the execution thereof after interruption of the execution of the command FSIN, because the command FSIN belongs to the long command category. In this case, the command FSIN is called an interrupted command.

FIG. 9b shows the contents of information to be transferred and the order of transfer as well as the allocation of addresses of the RAM 103, for the purpose of executing the command FSAVE under the condition as mentioned above.

As shown in the figure, the contents of information to be saved from the FPU 101 to the RAM 103 include the frame header FH, the interrupted command FSIN and its instruction address $IAR_k$ as well as contents of the temporary registers TR0 to TR7 of the EU 202.

The word count WC of the frame header FH in this case assumes the value 26, and this means that a further 26 words are transferred in addition to the frame header FH itself. The interrupted command FSIN and its instruction address $IAR_k$ are held in the command register 217 and the instruction address register 218 of the execution unit 202, respectively. Further, the temporary registers TR0 to TR7 hold the intermediate results of the interrupted execution of the command FSIN.

The FPU 101 transfers the information of the contents as mentioned above to the RAM 103 in the following order. First of all, the frame header FH is transferred to the location of address $n of the RAM 103. Next, contents of the temporary register TR7 are transferred to the locations of addresses $n+68, $n+64 and $n+60 of the RAM 103, and then contents of the temporary registers TR6 to TR0 are successively transferred to the locations of respectively allocated addresses, as shown in FIG. 9b.

Thereafter, the instruction address $IAR_k$ of the interrupted command FSIN is transferred to the location of address $n+8 of the RAM 103, and lastly, the interrupted command FSIN is transferred to the location of address $n+4.

Next in FIG. 10a, there is shown a timing chart of the execution under the condition that, when the CPU 100 issues a save command FSAVE, the FPU 101 is in the interruption processing ((EX1, EX0)=(1, 0)) and there is an command which is unexecuted (OPL=1). Similarly to the case as mentioned above, a command FSIN belonging to the long command category will be taken as an example.

The CPU 100 issues a command FSIN as well as an operand $OPS_k$ and instruction address $IAR_k$ thereof, and the transfers them to the FPU 101. Then, the CPU 100 successively issues a command $CMD_{k+1}$ and its operand $OPS_{k+1}$ and instruction address $IAR_{k+1}$ and transfers them to the FPU 101.

In the FPU 101, after receipt of the command FSIN and its accessories in the BCU 200, the FCU 201 converts the format of the operand $OPS_k$ and then the EU 202 starts the execution of obtaining a value of the sine function with respect to the format-converted operand $OPS_k$. During the execution of the command FSIN by the EU 202, the BCU 200 receives the command $CMD_{k+1}$ and its accessories, and then the FCU 201 performs the format-conversion of the operand $OPS_{k+1}$. At this time, the EU 202 continues to execute the command FSIN.

Under these circumstances, if the CPU 100 issues a save command FSAVE and its instruction address $IAR_{k+2}$, the FPU 101 receives them and starts the execution of the command FSAVE after interruption of the execution of the command FSIN by the EU. Therefore, the received command $CMD_{k+1}$ remains unexecuted. Namely, in this case, the command FSIN is an interrupted command and the command $CMD_{k+1}$ is an unexecuted command.

There are shown in FIG. 10b the contents of information to be transferred and the order of transfer as well as the allocation of addresses of the RAM 103, for the purpose of executing the command FSAVE under the condition as mentioned above.

As shown in this figure, the contents of information to be saved from the FPU 101 to the RAM 103 include the frame header FH, the interrupted command FSIN, its instruction address $IAR_k$, contents of the temporary registers TR0 to TR7 of the execution unit 202, the unexecuted command $CMD_{k+1}$ and its instruction address $IAR_{k+1}$ and operand $OPS_{k+1}$. The total number of words to be transferred amounts to 32 words.

The word count WC of the frame header FH in this case assumes the value 31 and indicates that there are further 31 words to be transferred, in addition to the frame header FH. The interrupted command FSIN and its instruction address $IAR_k$ are held in the command register 217 and the instruction address register 218 of the execution unit 202, respectively. The temporary registers TR0 to TR7 hold intermediate results of the interrupted execution of the command FSIN.

Further, the unexecuted command $CMD_{k+1}$ and its instruction address $IAR_{k+1}$ are held in the command register 212 and the instruction address register 213 of the format conversion unit 201. The operand $OPS_{k+1}$ thereof is held in the input register 219 of the format conversion unit 201 in the converted format of three words.

The FPU 101 transfers the information of the contents as mentioned above to the RAM 103 in the following order. First of all, the frame header FH is transferred to the location of address $n of the RAM 103. Next, the format-converted operand $OPS_{k+1}$ of the unexecuted command $CMD_{k+1}$ are transferred to the locations of addresses $n+7C, $n+78 and $n+74 of the RAM 103. Then, the instruction address $IAR_{k+1}$ and the unexecuted command $CMD_{k+1}$ are transferred to the locations of addresses $n+70 and $n+6C.

Further, contents of the temporary registers T0 to TR7 are transferred to the locations of addresses $n+68 to $n+C of the RAM 103. Thereafter, the instruction address $IAR_k$ of the interrupted command FSIN is transferred to the location of address $n+8 of the RAM 103, and lastly, the interrupted command FSIN is transferred to the location of address $n+4 of the RAM 103.

FIG. 11a is a timing chart of the execution under the condition that when the CPU 100 issues a save command FSAVE, the FPU 101 is in the exceptional status ((EX1, EX0)=(1, 1)), but there is no command unexecuted (OPL=0).

The CPU 100 issues a command $CMD_k$ and its operand $OPS_k$ and instruction address $IAR_k$, and transfers them to the FPU 101 one after another. In the FPU 101, the BCU 200 receives them and the FCU 201 converts the format of the operand $OPS_k$. The EU 202 starts the execution of the command $CMD_k$ with respect to the format-converted operand $OPS_k$. During the execution of the command $CMD_k$, however, the EU 202 can no longer continue the execution and stops because of occurrence of the exception, such as an overflow. When the FPU 101 is in this status, the CPU 100 issues a save command FSAVE and its instruction address $IAR_{k+1}$. In this case, the command $CMD_k$ is called an exceptional command, hereinafter.

There are shown in FIG. 11b the contents of information to be transferred and the order of transfer as well as the allocation of addresses of the RAM 103, for the purpose of executing the command FSAVE under the condition as mentioned above.

As shown in this figure, the contents of information to be saved from the FPU 101 to the RAM 103 include the frame header FH, the exceptional command $CMD_k$ and its instruction address $IAR_k$ and operand $OPS_k$. Hereinafter, the last two will be called an exceptional instruction address and an exceptional operand, respectively. Further, the microprogram 203 (cf. FIG. 2) is programmed so as to always store the exceptional operand $OPS_k$ in the temporary register TR0. The information to be transferred further includes contents of the temporary registers TR7 to TR1, which are in fact empty. In this case, the total number of words to be transferred amount to 27 words, including the frame header FH.

The word count WC of the frame header FH in this case has the value 26 and indicates that there are a further 26 words to be transferred, in addition to the frame header FH. The exceptional command $CMD_k$ and its instruction address $IAR_k$ are stored in the command register 217 and the instruction address register 218 of the execution unit 202, respectively. In the exceptional operand $OPS_k$, there exists data which caused the exception. Although the contents of the temporary registers TR7 to TR1 are transferred, they have no special significance.

The order of transfer of the information as mentioned above is as follows. As shown in FIG. 11b, first of all, the frame header FH is transferred to the location of address $n of the RAM 103. Then, the contents of the temporary registers TR7 to TR1 are transferred to the locations of addresses $n+68 to $n+18 of the RAM 103, however, as already described, they have no special significance. Next, the contents of the temporary register TR0 are transferred to the location of addresses $n+14 to $n+C as the exceptional operand.

Thereafter, the instruction address $IAR_k$ of the exceptional command $CMD_k$ is transferred to the location of address $n+8 of the RAM 103, and lastly the exceptional command $CMD_k$ is transferred to the location of address $n+4 of the RAM 103.

Referring lastly to FIG. 12a, there is shown a timing of the execution under the condition that when the CPU 100 issues a save command FSAVE, the FPU 101 is in the exceptional status ((EX1, EX0)=(1, 1)) and there is a command which is unexecuted (OPL=1).

The CPU 100 issues a command $CMD_k$ and its operand $OPS_k$ and instruction address $IAR_k$, and transfers them to the FPU 101. Then, a next command $CMD_{k+1}$ and its operand $OPS_{k+1}$ and instruction address $IAR_{k+1}$ are issued and transferred to the FPU 101.

In the FPU 101, after the BCU 200 receives the command $CMD_k$ and its accessories, the FCU 201 converts the format of the operand $OPS_k$. The EU 202 executes the command $CMD_k$, using data of the operand $OPS_k$. During the time the EU 202 executes the command $CMD_k$, the BCU 200 receives the command $CMD_{k+1}$ and its accessories, and the operand $OPS_{k+1}$ thereof is subject to the format-conversion in the FCU 201. In the example shown, the exceptional status occurs during the execution of the command $CMD_k$, whereby the execution becomes no longer possible and the EU 202 stops. Under those circumstances, the CPU 100 issues the command FSAVE and its instruction address $IAR_{k+2}$. In this case, the command $CMD_k$ becomes an exceptional command and the command $CMD_{k+1}$ becomes an unexecuted command.

There are shown in FIG. 12b the contents of information to be transferred and the order to transfer as well as the allocation of addresses of the RAM 103 in the execution of the command FSAVE under the condition as mentioned above.

As shown in the figure, the contents of information to be saved from the FPU 101 to the RAM 103 include the frame header FH, the exceptional command $CMD_k$ and its instruction address $IAR_k$ and operand $OPS_k$. Also in this case, the last two are called an exceptional instruction address and an exceptional operand, respectively. Further, the exceptional operand $OPS_k$ is held in the temporary register TR0. The information to be transferred further includes the unexecuted command $CMD_{k+1}$ and its instruction address $IAR_{k+1}$ and operand $OPS_{k+1}$ as well as insignificant contents of the temporary registers TR7 to TR1. The total number of words to be transferred amounts to 32 words.

As shown in FIG. 12b, the word count WC of the frame header FH in this case has the values 31 and indicates that there are a further 31 words to be transferred, in addition to the frame header FH. In the same manner as that in FIG. 10b, the unexecuted command $CMD_{k+1}$ is a command which remained unexecuted because of occurrence of the exception, although it was received by the FPU 101. Its instruction address $IAR_{k+1}$ and operand $OPS_{k+1}$ are also the same as those in FIG. 10b.

Also, the exceptional command $CMD_k$, the exceptional instruction address $IAR_k$ and the exceptional operand $OPS_k$ as well as the insignificant contents of the temporary registers TR7 to TR1 are the same as those shown in FIG. 11b.

The order of transfer of the information as mentioned above is as follows. As shown in FIG. 12B, first of all, the frame header FH is transferred to the location of address $n of the RAM 103. Next, the unexecuted operand $OPS_{k+1}$ is transferred to the location of addresses $n+7c to $n+74 of the RAM 103, and then the unexecuted instruction address $IAR_{k+1}$ and the unexecuted command $CMD_{k+1}$ are successively transferred to the locations of addresses $n+70 and $n+6C, respectively.

After that, the insignificant contents of the temporary registers TR7 to TR1 are transferred to the locations of addresses $n+68 to $n+18 of the RAM 103. The contents of the temporary register TR0 are transferred to the location of addresses $n+14 to $n+C as the exceptional operand.

Lastly, the exceptional instruction address $IAR_k$ and the exceptional command $CMD_k$ are transferred to the locations of addresses $n+8 and $n+4 of the RAM 103, respectively.

As described above, when the FPU 101 receives a save command FSAVE, it discriminates, in accordance with the status of the execution unit 202 and the category of a current command under execution, whether the FPU 101 is called to interrupt the execution of the current command and start the processing of the command FSAVE or whether it is to continue the execution of the current command and delay the processing of the command FSAVE. Therefore, the saving operation of the FPU 101 becomes possible according to the status of the FPU 101.

Further, the information to be saved includes the coprocessor identification COP.ID, the word count WC and various indexes, such as EX and OPL, representing the internal status of the FPU 101, in addition to contents of registers, which hold intermediate results of the processing within the FPU 101. With this, the restoring operation, which will be described later, can be performed in a safe and reliable manner.

Although it has already stated that the FPU 101 unconditionally receives a save command FSAVE issued by the CPU 100, the reasons therefor are as follows. As a manner of receiving a save command FSAVE in the FPU 101, there can be considered the following two cases:

1) after receiving a save command FSAVE, the FPU 101 prepares itself for the execution thereof (unconditional receipt of a save command FSAVE); and
2) before receiving a save command FSAVE, the FPU 101 prepares itself for the execution thereof.

In the embodiment described above, as measures for reducing the time necessary for preparing the execution of a save command FSAVE, a current command under execution upon receipt of the command FSAVE continues to be executed and the execution of the command FSAVE is delayed, if the current command is a short command. On the contrary, if the current command is a long command, the execution thereof is interrupted and the command FSAVE starts to be executed at once.

In the FPU 101, which adopts measures for reducing the preparing time, the measures become much more effective, if the FPU 101 prepares itself for the execution of a save command FSAVE after receiving it, as described in the case 1) above. Therefore, the unconditional receipt of a save command FSAVE is adopted in the embodiment. However, it is to be noted that the present invention is never limited to the unconditional receipt of a save command FSAVE.

Now, the information, which has been at first saved in the RAM 103, must be restored in the FPU 101 again, when the FPU 101 restarts the execution of an unexecuted command, an interrupted command and/or an exceptional command. In the following, a description will be made of the restoring operation of the saved information to the FPU 101.

A command, which is used in order to restore the saved information from the RAM 103 to the FPU 101 again, is called a restore command FREST. Therefore, the operation of execution of a restore command FREST will be described, hereinafter. The process of execution of a restore command FREST is shown by a flow chart of FIG. 13.

At first, the CPU 100 issues a restore command FREST to the FPU 101 (step 1301). The issuance of the command FREST is managed by a program of the operating system of the coprocessor system. After issuing the command FREST, the CPU 100 instructs the RAM 103 to transfer a frame header FH to the FPU 101 (step 1302). The frame header FH transferred in this time has the same structure as the frame header, which is transferred to the RAM 103 as one of the information to be saved and therefore has the same structure as shown in FIG. 6 at the time of the save operation.

The FPU 101 can receive the command FREST, only when it is idle. Therefore, the FPU 101 discriminates its own internal status (step 1303) and sends the discrimination result to the CPU 100 as the signal CPST.

If there remains an unexecuted command or a command under execution within the FPU 101, i.e., if the discrimination result at step 1303 is "no", the FPU 101 judges that the command FREST can not be received and requests the CPU 100 to reissue the command FREST (step 1305). In response to this request, the CPU 100 instructs the RAM 103 to retransfer the frame header FH, again. This operation is repeated, until execution of the unexecuted command or the command under execution is completed, i.e., until the result in the discrimination at step 1303 changes to "yes".

If an command within the FPU 101 is completely executed, the FPU 101 acknowledges the command FREST to the CPU 100 (step 1304). In response thereto, the CPU 100 issues an instruction address of the command FREST to the FPU 101. Then, the FPU 101 checks the number of transfer words by comparing a value of the word count WC with the combination, of the indexes EX (EX1, EX0) and OPL, of the frame header FH transferred from the RAM 103 (step 1307).

If the relationship between the combination of EX (EX1, EX0) and OPL and the word count WC meets the correspondence as presented in the table 2, the number of transfer words is judged to be normal and the FPU 101 informs the CPU 100 thereof (step 1308), and otherwise the FPU 101 informs the CPU 100 that the number of transfer words is abnormal (step 1309).

In the case where the CPU 100 is informed that the number of transfer words is normal, the CPU 100 instructs the RAM 103 to transfer the remaining part of the information saved by the execution of a save command FSAVE. In response to this instruction, the RAM 103 transfers the information to be restored to the FPU 101 (step 1310). At this time, the FPU 101 can recognize the format and contents of the transferred information from the contents of the frame header FH and therefore will store them in corresponding registers of the FPU 101.

Further, it is to be noted that the frame header FH is transferred at first both in a save command FSAVE and in a restore command FREST, however the order of transfer of the remaining words is different in the latter from that in the former. In this manner, by transferring the frame header FH first and checking the correctness thereof, an erroneous restoring operation can be prevented.

FIG. 14 shows contents of information to be restored in the FPU 101 in the case of (EX1, EX0)=(0, 0) and OPL =0 in the frame header FH. Namely, this corresponds to the case of the saved information described with reference to FIGS. 7a and 7b. This figure also indicates an order of transfer (ORD) and an address (ADD) of the RAM 103, from which the information to be restored is read out. In this case, as shown in the figure, the word count WC of this frame header FH is zero, which indicates that information to be restored is the frame header FH only.

FIG. 15 shows the contents of information to be restored in the FPU 101 in the case of (EX1, EX0)=(0, 0) and OPL =1. Therefore, this corresponds to the case of the saved information described with reference to FIGS. 8a and 8b. Since the word count WC in this case is 5, the total number of transfer words amounts to 6 words.

The order of transfer is as follows. The frame header FH, which is read out from the address $n of the RAM 103, is at first transferred. Then, the unexecuted command read out from the address $n+4 of the RAM 103 and the instruction address read out from the address $n+8 are transferred to the FPU 101 successively. Lastly, the operand read out from the addresses $n+C to $n+14 of the RAM 103 are transferred to the FPU 101 in the order as shown.

FIG. 16 shows the contents of information to be restored in the FPU 101 in the case of (EX1, EX0)=(1, 0) and OPL =0. This corresponds to the case of the saved information described with reference to FIGS. 9a and 9b. As shown in the figure, the word count WC in this case amounts to 26 and therefore the total number of transfer words amounts to 27 words. Also in this case, the frame header FH is at first transferred to the FPU 101. Although the order of transfer is different, the contents to be transferred are the same as those as shown in FIG. 9b.

As described above, in all cases, the frame header is at first transferred to the FPU 101 both in the transfer from the FPU 101 to the RAM 103 and in the transfer from the RAM 103 to the FPU 101. Also the contents of information to be transferred are the same in both transfer directions. The only difference therebetween is in the order of transfer. Therefore, the restoring operation as shown in FIGS. 17 to 19, which correspond to FIGS. 10b to 12b, respectively, can be easily understood.

In this manner, by executing a restore command FREST, the FPU 101 can recover the status according to the contents of the information restored, which corresponds to the status before the execution of a save command FSAVE. The table 3 indicates the relationship of the values of EX1, EX0 and OPL within the frame header FH, the FPU status to be restored by the FREST command and the FPU status just after the execution of the FREST command.

As indicated in the Table 3, when the execution of a restore command FREST is completed, the FPU 101 can restart the execution from a point, at which the execution thereof is interrupted by the command FSAVE.

TABLE 3

| Value of Frame Header | | | FPU status to be restored by FREST | | FPU status just after FREST execution | |
|---|---|---|---|---|---|---|
| | | | Unexecuted Command | Execution Unit | Unexecuted Command | Execution Unit |
| EX1 | EX0 | OPL | Yes/No | State | Yes/No | State |
| 0 | 0 | 0 | No | Idle | No | Idle |
| 0 | 0 | 1 | Yes | Idle | No | Execution start |
| 1 | 0 | 0 | No | Processing | No | Execution restart |
| 1 | 0 | 1 | Yes | Processing | Yes | Execution restart |
| 1 | 1 | 0 | No | Exception | No | Exception |
| 1 | 1 | 1 | Yes | Exception | Yes | Exception |

Further, the following use of the frame header FH can be considered.

1) In the case where a save command FSAVE is issued when a coprocessor stops due to an exception, a frame header of an information to be saved in an external memory has (EX1, EX0)=(1, 1). When the saved information is restored, although the frame header is usually transferred to the coprocessor with the same value of (EX1, EX0), it can be also restored with (EX1, EX0) changed to (0, 0), for example. With this, the coprocessor can restart the processing from the point at which it stops.

2) In a coprocessor system including plural coprocessors, a frame header of information saved from a coprocessor is restored with a coprocessor identification COP.ID changed to that of another coprocessor.

According to the embodiment, when saved information is restored in the FPU 101, because the FPU 101 judges whether or not a restore command FREST can be received properly, i.e., the FPU 101 is idle, and further because the restoring operation is carried out after checking the word count, an erroneous operation caused by restoring erroneous information to the FPU 101 can be prevented.

By the way, there is the following relationship between a time point at which a save command FSAVE starts to be executed and a time necessary for executing the FSAVE command. Here it is assumed that the CPU 100 issues a save command FSAVE when the FPU 101 executes a current command.

Under those circumstances, if the FPU 101 interrupts the execution of the current command and starts to execute the command FSAVE at once, there may occur a large amount of intermediate results of the interrupted execution of the current command, according to a point, at which the execution of the current command is interrupted. In this case, a large amount of information must be transferred to the RAM 103 by executing the command FSAVE. This fact requires a long time for the execution of not only a save command FSAVE, but also a restore command FREST which will be executed later.

On the contrary, if the FSAVE command starts to be executed after the execution of the current command is completed, there are no intermediate results as the information to be transferred to the RAM 103 by execution of the command FSAVE. In this case, since only a frame header FH is transferred, the time necessary for executing the command FSAVE becomes very short. Further, since the amount of the information saved is small, the time necessary for execution of a restore command FREST is short, too.

Accordingly, a time point of starting the execution of a save command FSAVE and a time necessary for executing the command FSAVE result in a problem of trade-off between both. In the embodiment as described above, as the solution of this problem, commands are classified into two categories, i.e., a short command group and a long command group, according to a time necessary for the execution thereof, and the execution of a command is interrupted only when a command under execution upon receipt of a save command FSAVE belongs to a long command group.

In order to further reduce an amount of information to be communicated between the FPU 101 and the RAM 103, the following improvement can be considered. According to the inventors' analysis, the amount of information (intermediate results), which occurs in the course of the execution of a command in the FPU 101, varies so as to repeatedly increase and decrease as a time from the start of execution of the command proceeds, and there are some points (i.e., steps in the process of execution of the command), at which the amount of the intermediate results becomes very small.

If, therefore, some markers are provided in advance at such points in a command execution and the FPU 101 interrupts the execution when detecting such a marker after receipt of a save command FSAVE, the start of execution of the command FSAVE is not delayed so much and the time necessary for executing the command FSAVE does not become long. With this, the effect of the present invention is much enhanced.

In the embodiment mentioned above, there has been used a RAM as an external memory which stores information to be saved. However, a special memory for that purpose can be provided within a processor. If a cache memory is provided, the high speed saving or restoring operation becomes possible.

Moreover, in the foregoing, the present invention has been described with respect to a coprocessor system. However, the present invention is not limited to a coprocessor system, but can be of course applied to usual processors. Also in a usual processor, when the execution of the processor is necessary to be interrupted, information within the processor must be saved in an appropriate storage. A saving and restoring method according to the present invention is applicable also to such a case, and in order to cope with such saving and restoring method, a processor can be constructed according to the present invention.

We claim:

1. A saving and restoring method in a processor system comprising at least one processor and a memory, which are coupled with each other through buses, and wherein, when the processor receives a save command, the processor saves information then existing within the processor in the memory and restores the saved information to the processor in response to a restore command, by executing the following steps:

a first step of receiving a save command;

a second step of, upon receipt of the save command, determining whether a current command being executed is a short command or a long command and the internal status of the processor, wherein detection of whether said current command is a short command or a long command is performed based on predetermined attribute information in accordance with an execution time necessary for executing a command;

a third step of performing either one of the following two operations in response to the result of said second step:
(1) causing the processor to interrupt the execution of said current command being executed and start the execution of the received save command if the attribute information of the current command indicates that said current command being executed is a long command, or
(2) causing the processor to execute the received save command after the execution of the current command being executed is completed if the attribute information of the current command indicates that said current command being executed is a short command;

a fourth step of executing the received save command to save the information within the processor in the memory in accordance with said third step; and a fifth step of restoring the saved information to the processor from the memory, when a restore command is issued, wherein a long command is provided with a marker at a point of the execution process thereof, at which if an amount of intermediate results which are caused by the execution of the current command being executed and which remains in the processor decreases to a predetermined level and if execution of the current command being executed detects a marker after receipt of the save command, the processor is made to interrupt the execution of the current command being executed and start execution of the save command upon detection of the marker.

2. A saving and restoring method according to claim 1, wherein information to be saved comprises a frame header including coded indexes representing the internal status of the processor and a word count representing a number of words of the information to be saved, in addition to intermediate results of the execution then existing within the processor.

3. A saving and restoring method according to claim 2, wherein when the restore command is issued, the processor restores therein the intermediate results saved, after the correctness of information transferred thereto is checked on the basis of the coded indexes included in the frame header.

4. A saving and restoring method according to claim 2, further comprising a sixth step of changing the coded indexes included in the frame header when the restore command is issued and restoring the saved information in the processor.

5. A saving and restoring method according to claim 2, wherein the processor system comprises plural processors and the frame header includes a processor identification representing the origin of the information to be saved.

6. A saving and restoring method according to claim 5, wherein when the restore command is issued, the processor restores therein the intermediate results saved, after the correctness of information transferred thereto is checked on the basis of the coded indexes included in the frame header.

7. A saving and restoring method according to claim 6, wherein the check of the correctness is carried out on the basis of the correspondence of a processor identification included in a frame header with an identification of a processor, in which the information transferred is to be restored, and the correspondence of coded indexes and a word count included in the same frame header.

8. A saving and restoring method according to claim 5, further comprising a sixth step of changing the processor identification in the frame header when the restore command is issued and restoring the saved information in a processor.

9. A saving and restoring method according to claim 5, further comprising a sixth step of changing the coded indexes in the frame header when the restore command is issued and restoring the saved information in a processor.

10. A saving and restoring method according to claim 2, wherein up receipt of the save command, the frame header is transferred to the memory first and upon receipt of the restore command, the saved frame header is transferred to the processor first.

11. A processor system having at least a processing unit and a memory coupled with each other through buses, wherein, when a save command is issued to the processing unit, information then existing within the processing unit is saved in the memory, wherein said processing unit comprises:

an interface unit, coupled to the buses, for providing an interface for the processing unit with other devices, including said memory;

an execution unit for performing a predetermined processing under the control of control signals applied thereto; and a control unit, coupled to said interface unit and said execution unit, for storing microprograms to generate the control signals for said execution unit;

wherein the microprograms are programmed such that when the processing unit receives a save command, the processing unit detects whether a current command being executed is a short command or a long command, detects an internal status thereof, wherein detection of whether said current command is a short command or a long command is performed based on predetermined attribute information, initiates either one of the following two operations: (1) causing the processing unit to interrupt the execution of said current command being executed to start the execution of the received save command if the attribute information of the current command indicates that said current command being executed is a long command, or (2) causing the processing unit to execute the received save command after the execution of the current command being executed is completed if the attribute information of the current command indicates that said current command being executed is a short command, and further wherein a long command is provided with a marker at a point of the execution process thereof, at which if an amount of intermediate results which are caused by the execution of the current command and which remains in the processor decreases to a predetermined level and if execution of said current command being executed detects a marker after receipt of the save command, the processor is made to interrupt the execution of said current command being executed and start execution of the save command upon detection of the marker.

12. A processor system according to claim 11, wherein said processing unit is further provided with a format conversion unit, which converts data received through said interface unit in an external format to that in an internal format of said processing unit.

13. A processor system according to claim 12, wherein said format conversion unit comprises a command register, which stores a command unexecuted upon receipt of the save command, and an input register, which stores an operand of the unexecuted command.

14. A processor system according to claim 12, wherein said execution unit comprises a command register, which stores a command interrupted by receipt of the save command or a command causing an exceptional stop of said execution unit, and temporary registers, which store intermediate results of the execution of the interrupted command or the exceptional command at the time of interruption or stop of said execution unit.

15. A processor system according to claim 14, wherein a particular one of the temporary registers always stores an operand of the interrupted command or the exceptional command.

16. A processor system according to claim 11, in which the processor system is a coprocessor system having the processing unit functioning as a coprocessor and another processing unit functioning as the host processor, wherein the save command and a restore command are issued by the host processor together with their operand and instruction address.

17. A processor system according to claim 16, wherein the coprocessor is further provided with a format conversion unit, which converts data received through said interface unit in an external format to that in an internal format of the processing unit.

18. A processor system according to claim 17, wherein said format conversion unit comprises a command register, which stores a command unexecuted upon receipt of the save command, and an input register, which stores an operand of the unexecuted command.

19. A processor system according to claim 17, wherein said format conversion unit comprises an instruction address register, which stores an instruction address of a command unexecuted upon receipt of the save command.

20. A processor system according to claim 16, wherein said execution unit of the coprocessor comprises a command register, which stores a command interrupted by receipt of the save command or a command causing an exceptional stop of said execution unit, and temporary registers, which store intermediate results of the execution of the interrupted command or the exceptional command at the time of interruption or stop of said execution unit.

21. A processor system according to claim 16, wherein said execution unit of the coprocessor comprises an instruction address register, which stores an instruction address of a command interrupted upon receipt of a save command or a command causing an exceptional stop of said execution unit.

22. A microprocessor system comprising:
a first processing unit; and
at least a second processing unit which is coupled to said first processing unit and carries out pipeline processing to support a specific processing of said first processing unit, said second processing unit includes:

an interface unit, coupled to buses, for providing an interface for said second processing unit with other devices of said microprocessor system, an execution unit for performing a predetermined processing on the basis of data from said interface unit under the control of control signals applied thereto, and a control unit, coupled to said interface unit and said execution unit, for executing a microprogram stored therein in accordance with a command from said interface unit to generate the control signals for said execution unit;

wherein when said second processing unit receives a save command during execution of a current command being executed which is determined to be a short command based on predetermined attribute information, said second processing unit executing the received save command after execution of the current command being executed is completed, and when said second processing unit receives the save command during execution of a current command which is determined to be a long command based on the predetermined attribute information, said second processing unit interrupts execution of the current command and starts execution of the received save command to save information within said second processing unit in an external memory, wherein the information to be saved in the external memory includes a frame header having a first index indicating the internal status of said execution unit and a second index indicating whether or not an unexecuted command exists in said second processing unit, and wherein when a restore command is issued by said first processing unit, said second processing unit restores therein the information saved in the external memory.

23. A microprocessor system according to claim 22, wherein said second processing unit further includes a format conversion unit, responsive to the control signals generated by said control unit, for converting data in an external format, which is supplied from the first processing unit and the other devices of the microprocessor system through said interface unit, into data in an internal format of said second processing unit, and vice versa.

24. A microprocessor system according to claim 23, wherein said format conversion unit comprises a command register for storing an unexecuted command upon receipt of the save command and an input register for storing an operand of the unexecuted command.

25. A microprocessor system according to claim 23, wherein said format conversion unit comprises an address register for storing an instruction address of the current command executed by said format conversion unit.

26. A microprocessor system according to claim 22, wherein the execution unit comprises a command register for storing a command interrupted by receipt of the save command or a command causing an exceptional stop of said execution unit.

27. A microprocessor system according to claim 22, wherein the execution unit comprises an address register for storing an instruction address of the current command being executed by said execution unit upon receipt of the save command and the exceptional command.

28. A microprocessor system according to claim 27, wherein the execution unit comprises temporary registers for storing intermediate results of execution of the interrupted command or the exceptional command at the time of interruption or stop of the execution unit.

29. A microprocessor system according to claim 28, wherein a particular one of said temporary registers always stores an operand of the interrupted command or the exceptional command.

30. A microprocessor system according to claim 22, including a plurality of second processing units, wherein the frame header further includes a processing unit identification for identifying one of said second processing units originating the information to be saved.

31. A microprocessor system according to claim 22, wherein correctness of information to be restored in said second processing unit is checked on the basis of the indices included in the frame header before restoring of the information in the external memory to said second processing unit.

32. A microprocessor system according to claim 31, wherein the check of the correctness of information to be restored is conducted by comparison of the processing unit identification included in the information and the identification of a second processing unit, in which the information is to be restored.

33. A microprocessor system according to claim 31, wherein there is provided a correspondence table between the indices and a word count, and the check of the correctness of information to be restored is conducted by comparing an actual word count with a word count referred to in the correspondence table.

34. A microprocessor system according to claim 22, further comprising means for changing the indices included in the frame header and restoring the information saved in the external memory in said second processing unit.

35. A microprocessor system according to claim 22, wherein the attribute information used to indicate whether a command is a short command or a long command is determined in accordance with an execution time necessary for said second processing unit to execute the command.

36. A microprocessor system according to claim 35, wherein a long command is provided with a marker at a point of the execution process thereof, at which an amount of intermediate execution results of the current command within said second processing unit decreases to a predetermined level, and wherein if execution of a current command detects the marker after receipt of the save command, said second processing unit is made to interrupt the execution of the current command and start execution of the save command.

37. A processor system having at least a processing unit and a memory coupled with each other through buses, wherein, when a save command is issued to the processing unit, information then existing within the processing unit is saved in the memory, said processing system comprises:

a first processing unit; and at least a second processing unit which is coupled to said first processing unit and carries out pipeline processing to support a specific processing of said first processing unit, said second processing unit includes:

an interface unit, coupled to the buses, for providing an interface for the processing unit with other devices, including said memory, an execution unit for performing a predetermined processing under the control of control signals applied thereto, a control unit, coupled to said interface unit and said execution unit, for executing a microprogram stored therein in accordance with a command from said interface unit to generate the control signals for said execution unit, and an external memory storing information including a frame header having a first index indicating an internal status of said execution unit and a second index indicating whether or not an unexecuted command exists in said second processing unit;

wherein said second processing unit executes a save command in accordance with an attribute included in the save command, and wherein said second processing unit restores information in accordance with the information stored in the external memory.

* * * * *